No. 789,898. PATENTED MAY 16, 1905.
J. S. BRIGGS.
FEEDER FOR FRUIT PITTING MACHINES.
APPLICATION FILED JUNE 2, 1904.

3 SHEETS—SHEET 1.

Witnesses
Inventor
John Smith Briggs
by Townsend Bros.
Attys.

No. 789,898. PATENTED MAY 16, 1905.
J. S. BRIGGS.
FEEDER FOR FRUIT PITTING MACHINES.
APPLICATION FILED JUNE 2, 1904.

3 SHEETS—SHEET 2.

Witnesses
J. Allan field
A. P. Knight

Inventor
John Smith Briggs
by Townsend Bros.
Attys.

No. 789,898. PATENTED MAY 16, 1905.
J. S. BRIGGS.
FEEDER FOR FRUIT PITTING MACHINES.
APPLICATION FILED JUNE 2, 1904.

3 SHEETS—SHEET 3.

Witnesses
F. Mansfield
A. P. Knight

Inventor
John Smith Briggs
by Townsend Bros,
Attys.

No. 789,898. Patented May 16, 1905.

UNITED STATES PATENT OFFICE.

JOHN SMITH BRIGGS, OF LOS ANGELES, CALIFORNIA.

FEEDER FOR FRUIT-PITTING MACHINES.

SPECIFICATION forming part of Letters Patent No. 789,898, dated May 16, 1905.

Application filed June 2, 1904. Serial No. 210,781.

*To all whom it may concern:*

Be it known that I, JOHN SMITH BRIGGS, a citizen of the United States, residing at Los Angeles, in the county of Los Angeles and State of California, have invented new and useful Improvements in Feeders for Fruit-Pitting Machines, of which the following is a specification.

This invention relates to an improved feeding mechanism adapted to be applied to fruit-pitting machines, and especially to that class of machines described by me in Letters Patent No. 460,740, dated October 6, 1891, and in my application, Serial No. 168,884, filed August 10, 1903, certain matter herein shown, but not claimed, being claimed in said application.

The primary object of this invention is to provide improved feeding mechanism whereby as the fruits are delivered by the feed-trough toward the pitting mechanism each fruit is automatically and positively held and delivered to such pitting mechanism and the feeding positively controlled and regulated.

A further object is to provide such mechanism in simple, cheap, and durable form which shall be positive and efficient in operation.

Another object of my present invention is to provide improved means for conveying the fruits to and directing them squarely upon the edge of the cutter-disk.

Another object is to prevent the said fruits from being thrown out of the machine by centrifugal force when fed rapidly to the cutter-disk by the rotary feeder.

A further object is to provide feeding mechanism which will not bruise delicate fruits.

Figure 1:
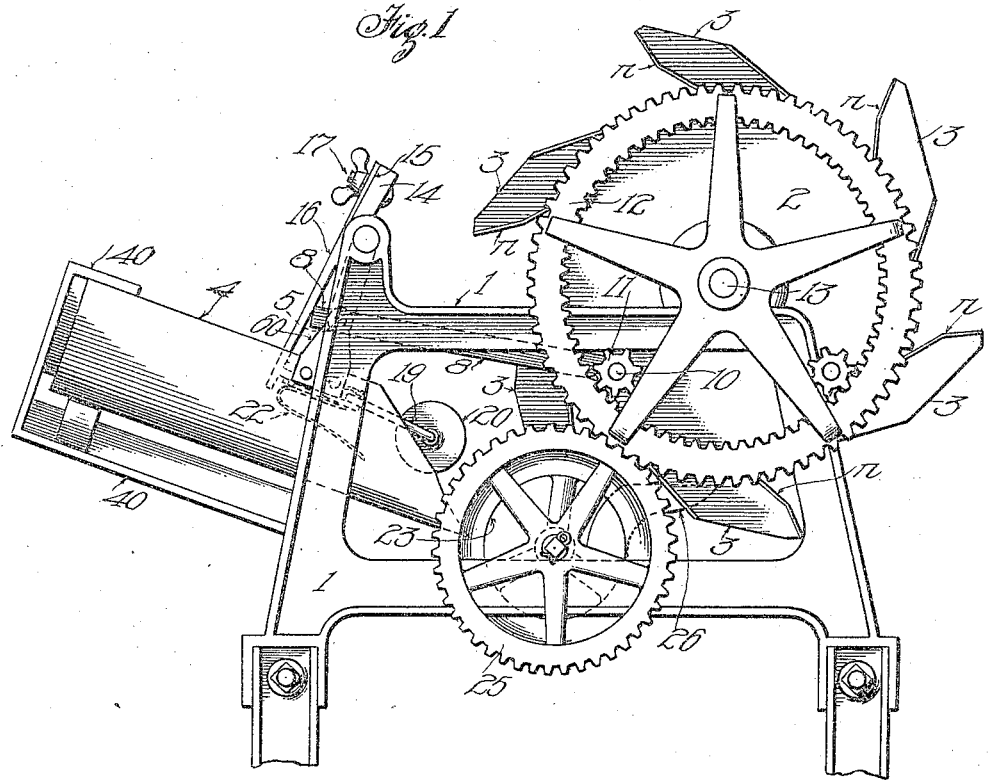
Figure 2:
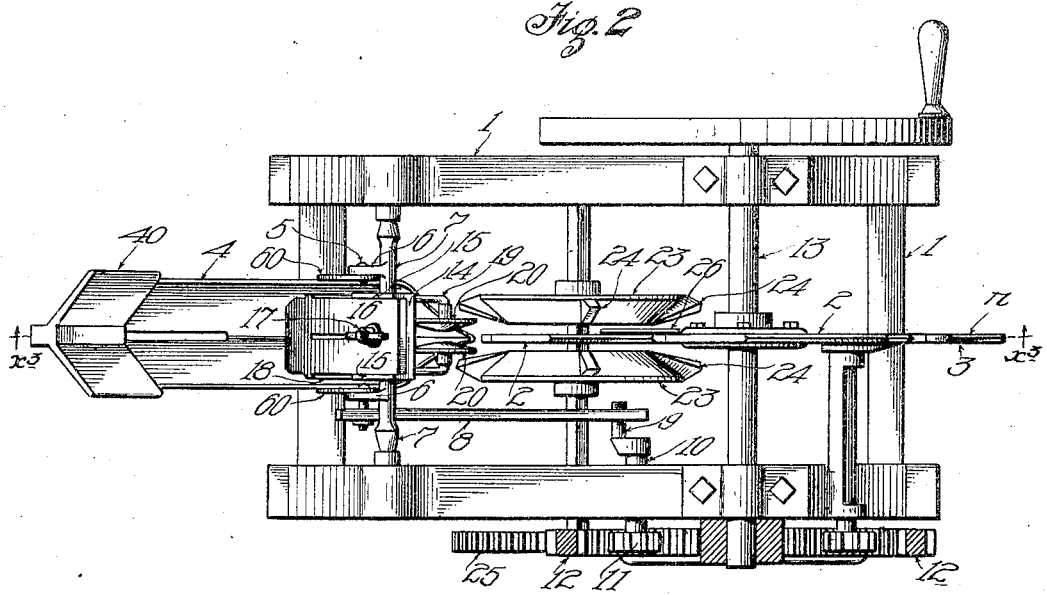
Figure 3:
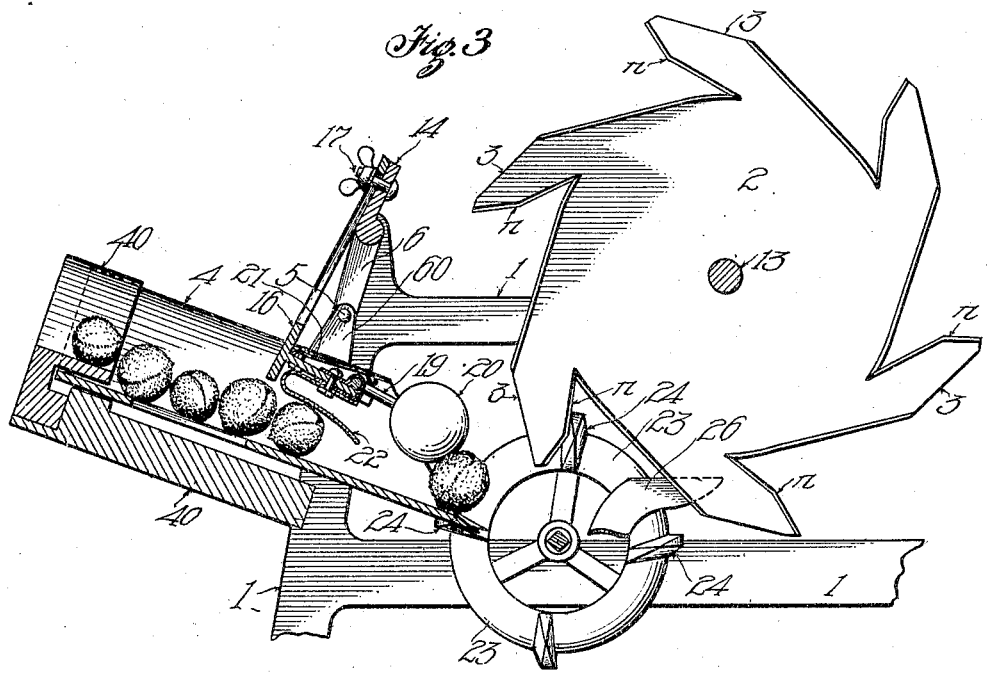
Figure 4:
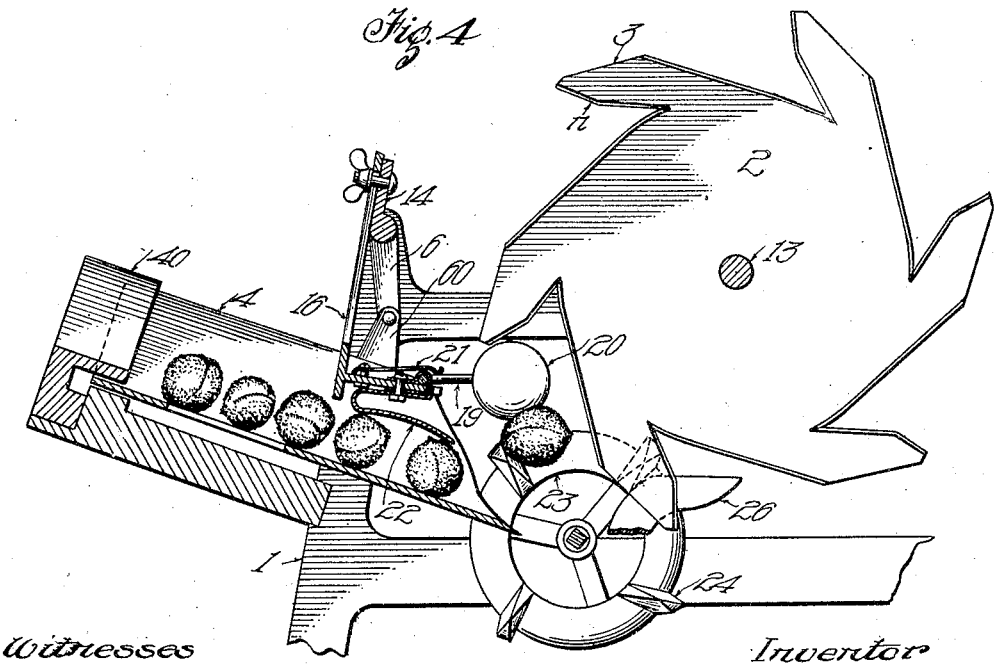
Figure 5:
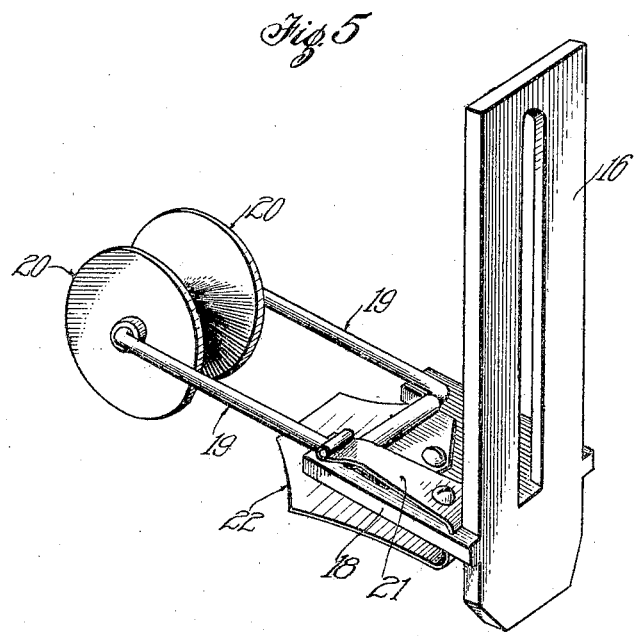
Figure 6:
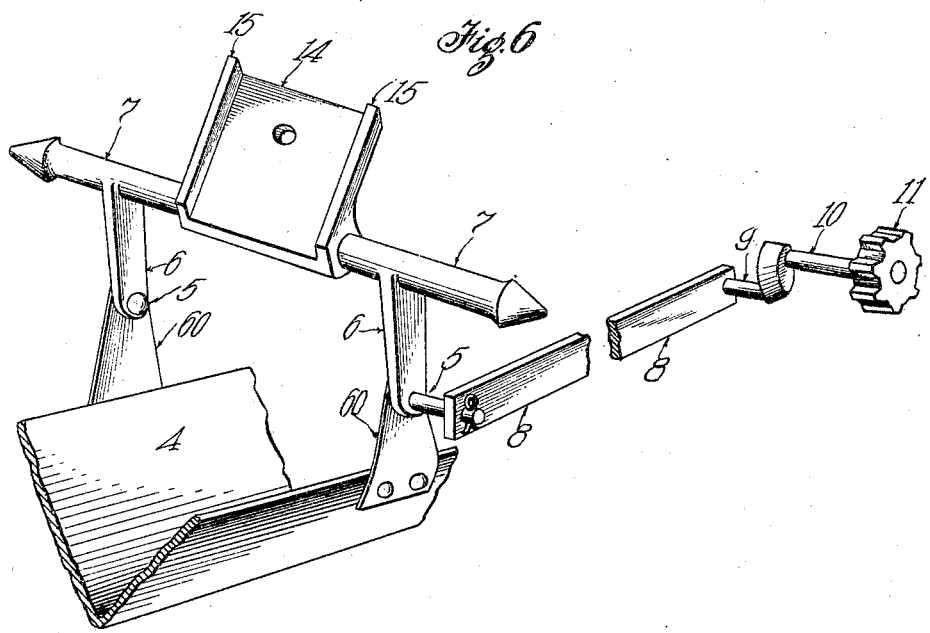

Referring to the accompanying drawings, Figure 1 is a side elevation of a fruit-pitting machine provided with my improved feeder. Fig. 2 is a plan thereof. Fig. 3 is a vertical section on the line $x^3\ x^3$ in Fig. 2. Fig. 4 is a similar section showing the feeding parts in a different position from that shown in Fig. 3. Fig. 5 is a detail perspective of the adjustable feeder. Fig. 6 is a detail perspective of the vibratory support therefor.

As illustrated in the drawings, 1 is the main frame of the machine, and 2 is the revolving cutting-disk provided with forwardly-projecting blades 3, which form, with the opposite knife-edges of the disk proper, V-shaped notches $n$.

The vibratory V-shaped feed-trough 4 is mounted in a guide-frame 40 and pivoted at 5 to the depending arms 6 and 60, attached to the rock-shaft 7. To the arm 60 is pivoted, preferably at the extreme lower end thereof, the pitman 8, said pitman being reciprocated by any suitable means, as by a wrist-pin 9, connected with a shaft 10, provided with a pinion 11, meshing with the internal gear-teeth of a cog-wheel or gear 12, which is mounted upon the main shaft 13. The rock-shaft 7 not only serves to operate the vibratory feed-trough, but carries and operates the feeder, which consists of a member 16, mounted on said shaft, and fruit-detaining feeding devices 22 20, hereinafter described, mounted on member 16 to yield independently of one another.

The rock-shaft 7 is preferably provided with an upward extension 14, furnished with ribs 15 on one face thereof. A slotted slide 16 is mounted between said ribs and provided with a set-screw 17, having a thumb-nut for adjusting said slide to raise or lower the same. The slide 16 has a bracket 18 extending therefrom, on which is pivoted a frame or bail 19, carrying at its outer end the freely-rotatable feeding device, consisting of two disks or wheels 20, rotatably mounted upon the ends of the two arms of the bail or frame 19. The inner faces of these wheels—that is to say, the faces which are presented toward one another—are preferably conical. A spring 21 bears on the frame 19 to press the feeder-wheels 20 downwardly toward the feed-trough 4 and against the fruit therein. A leaf-spring 22, fastened to the under side of the bracket 18, extends downwardly and forwardly toward the outlet of the trough, so as to engage with and retain the fruit temporarily in its passage, as hereinafter described.

23 designates a rotating conveyer which is journaled on the frame 1 in front of the outlet end of feed-trough 4 and consists of two disks or wheels, preferably tapering toward each other and separated from one another sufficiently to allow revolving cutting-disk 2 to work between them. The conveyer-disks 23 are provided with projections or flights 24 to engage and carry forward the fruit, as hereinafter described. The said rotating conveyer is driven by a gear-wheel 25, mounted on its shaft and engaging with the main gear-wheel 12 aforesaid.

26 designates one of the pulp-severing knives. A fragment only of the parts is shown, since they form no part of my present invention.

The feeder parts are arranged with the member 16 extending downwardly from the pivotal support thereof and the bracket 18 extending from said member 16 rearwardly or in the direction of movement of the fruit, so that the spring 22 and rotating feeder device 20 will extend in position to engage successively with the fruit as it passes along the trough. As the arm 60 is vibrated by the action of pitman 8 the feed-trough is given a to-and-fro longitudinal movement, and at the same time the feeder parts, above described, are rocked or vibrated. The yielding detaining device 22 is intended to engage with fruits of various sizes to prevent the fruit from crowding toward the rotary conveyer, and the rotary feeding device 20 insures that the fruits will be fed to the conveyer one at a time, the spring 21 thereof allowing said rotary feeder to yield and to be lifted by the fruit sufficiently to allow passage of the fruit without bruising. It will be noted that the rotary feeder is located beyond or in the rear of the detaining device 22. The rotary feeder and the detaining device are both connected to and reciprocate synchronously with the feed-trough, so that the fruit is carried forward bodily at predetermined intervals and presented singly to the conveyer, which carries it forward to the pitting devices.

The fruit detaining and feeding devices 22 20 can by adjusting slide 16 be made to rest easily on different sizes of fruit, so as to give just sufficient pressure for their proper action without bruising the fruit.

What I claim is—

1. The combination with fruit-pitting mechanism, of a revolving conveyer adapted to feed fruits singly thereto, a trough for directing the fruits to said conveyer, a yieldingly-supported fruit-detaining device located over the feed-trough, a freely-rotatable feeding device located over the feed-trough between the said detaining device and the conveyer, and means for reciprocating said detaining and feeding devices toward and from the conveyer.

2. The combination with fruit-pitting mechanism, of a revolving conveyer adapted to feed fruits singly thereto, a trough for directing the fruits to said conveyer, a yieldingly-supported fruit-detaining device located over the feed-trough, a freely-rotatable feeding device located over the feed-trough between the said detaining device and the conveyer, and means for synchronously reciprocating the trough, and detaining and feeding devices toward and from the conveyer.

3. The combination with fruit-pitting mechanism, of a revolving conveyer adapted to feed fruits singly thereto, a trough for directing the fruits to said conveyer, a feeder located above said trough in position to engage with the fruits therein, and means for reciprocating said feeder and said trough toward and from the conveyer, said feeder comprising a yielding fruit-detaining device and a rotatable feed device supported to yield independently of the detaining device.

4. The combination with fruit-pitting mechanism, of a revolving conveyer adapted to feed fruits singly thereto, a trough for directing the fruits to said conveyer, a feeder located above said trough in position to engage with the fruits therein, and means for reciprocating the trough and feeder toward and from the conveyer, said feeder comprising a yieldingly-supported fruit-detaining device located over the feed-trough, and a freely-rotatable feeding device located over the feed-trough between the said detaining device and the conveyer and supported to yield independently of the detaining device.

In testimony whereof I have signed my name to this specification, in the presence of two subscribing witnesses, at Los Angeles, in the county of Los Angeles and State of California, this 21st day of May, 1904.

JOHN SMITH BRIGGS.

In presence of—
ARTHUR P. KNIGHT,
JULIA TOWNSEND.